(No Model.)
G. MILLER.
CARAMEL HOLDER.
No. 502,676. Patented Aug. 1, 1893.
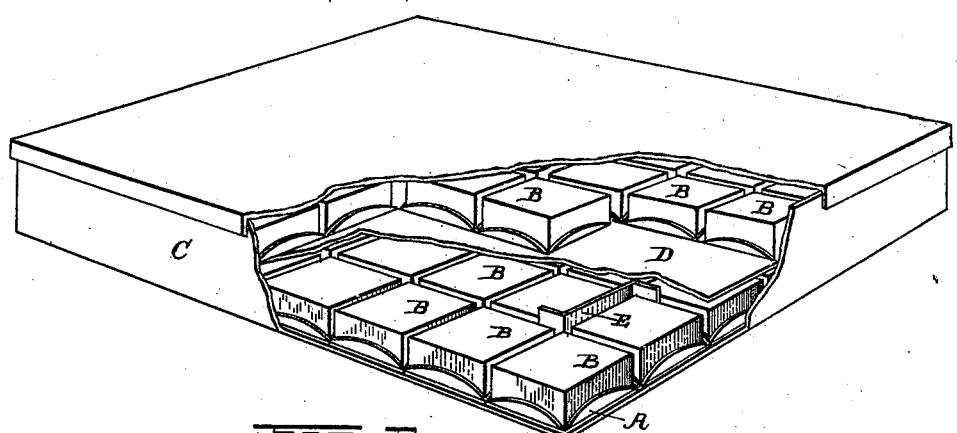
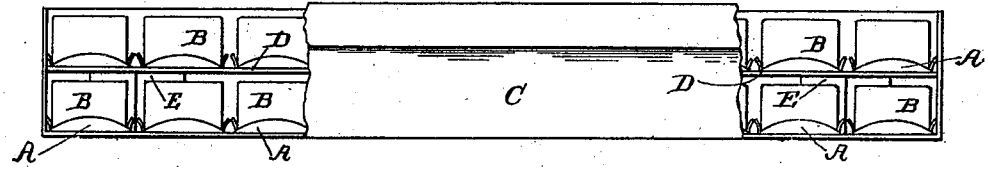
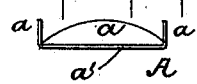
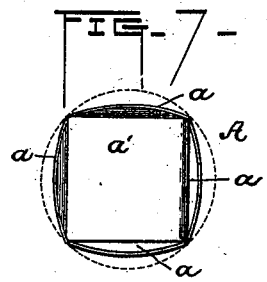
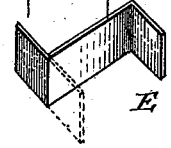
Witnesses
James T. Brown
P. L. Clark.
Inventor
George Miller,
By _____
Attorney

UNITED STATES PATENT OFFICE.

GEORGE MILLER, OF BALTIMORE, MARYLAND.

CARAMEL-HOLDER.

SPECIFICATION forming part of Letters Patent No. 502,676, dated August 1, 1893.

Application filed January 14, 1893. Serial No. 458,343. (No model.)

*To all whom it may concern:*

Be it known that I, GEORGE MILLER, a citizen of the United States, residing at Baltimore, Maryland, have invented certain new and useful Improvements in Caramel-Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to pans for confectioners' use, and its object is to provide a pan for holding caramels, and similar confections which shall be simple and cheap to make, which prevents the confections from coming in contact either with each other or with those in the next layer above, and which displays each confection to its best advantage.

In the manufacture of caramels and similar confections it is necessary to provide means for holding them apart to prevent their adhering, and it is desirable that they be displayed in an attractive manner, and that the holder shall not hide them or apparently diminish their size. It is also desirable to relieve each layer of caramels from the weight of the layers above. Many pans have been devised for this purpose, in some of which the caramels are separated by tongues, punched up from the bottom of the pan, while in others, the confections are impaled on sharp points. These pans are more or less expensive to make and there are certain objections to them. My invention aims to overcome these objections, and to furnish a neat, efficient and handsome holder at a low cost.

In the drawings, Figure 1 is a perspective view of a box partly broken away to show my holders or pans containing caramels. Fig. 2 is a side elevation partly in section. Figs. 3 and 4 are sections of modifications of holders. Fig. 5 shows a caramel provided with two holders. Fig. 6 shows one of the supports for separating layers. Fig. 7 is a plan view of a single holder.

The pan or holder A is made of any suitable material, and just large enough to receive a single confection, such as the caramel B. The sides of the pan consist of lips or flanges $a$, turned up from and integral with the bottom $a'$. The lips may be of any suitable shape, but the corners of the pan are preferably left open as shown in Fig. 1, so as to display the whole thickness of the caramel. I prefer to form the pans from circular disks as shown in dotted lines in Fig. 7, so that I may utilize the waste pieces punched out in making the tops of metal cans. When the edges of such a circular disk are turned up on the lines of an inscribed square, they form rounded flanges which are neat and attractive. The flanges may be vertical as shown in Fig. 4, but I prefer to slightly flare them, or the upper portion of them, so that when a quantity of pans are assembled in a tray, they stand a little apart as shown in Fig. 2, whereby the caramels are prevented from touching and are more easily grasped when one is to be picked up from a trayful.

If desired, a spur may be punched up in the bottom of the pan, to assist in holding the pan and caramel together. The spur may be smooth and sharp as at $a^2$, Fig. 3, or it may be merely a rough projection formed by driving a punch up through the bottom of the pan. Moreover two pans may be used as shown in Fig. 5, when extra protection is wanted. These pans are intended to be given away when the confection is sold.

I have shown the invention as embodied in a square pan, but it is evident that the shape is immaterial, since it may be irregular, or polygonal, or round, to suit the shape of the confection, or the fancy of the user.

When a layer of caramels in these holders has been placed in a tray or box C, a sheet of stiff material D, such as card board is laid over them to hold the next superimposed layer. In order to prevent the sheet from resting on the caramels, supports E are placed here and there among the caramels, standing on the bottom of the box, and projecting above the tops of the caramels. These supports are pieces of stiff material such as sheet metal, bent twice at an angle to give them stability, and of such a length between the bent ends that they fit in between the caramels. It is preferred to bend them in a zigzag shape but they may be formed as indicated in dotted lines in Fig. 6. It is found that single L-shaped supports are easily upset; but this difficulty is overcome by giving them two bends as above set forth.

I am aware that a caramel holder has been produced by suitably cutting or punching a metal plate to provide lips that can be turned at right angles to the plate to form the sides of the holder. Such construction has holes left in the bottom from which the aforesaid sides are bent and also considerable spaces between the sides at the points where the vertical edges of the caramel will in use be situated. The caramels if soft are liable to settle into such holes or spaces, thereby losing their shape and adhering to others adjacent thereto. Furthermore when a number of the holders are packed in a box, they are kept apart solely by the abutting edges of the flat flanges, which on the least disturbance are liable to become overlapped. This not only brings them into contact with the exposed corner portions of the caramels, but it also destroys the regularity of the packing and loosens the holders in the box and throws them into disorder. With my holder this cannot happen, since the holders pack tightly together, and it is impossible to disarrange them.

I am aware of the patent to Wiest, No. 428,765, and am familiar with his invention. The L-shaped supports are found to be easily upset by the handling of the package during shipment, and it is to overcome the practical difficulties and annoyances experienced with this L-shaped support that I have devised the zigzag one herein shown and described.

Having thus described my invention, what I claim, and desire to secure by Letters Patent, is—

1. A caramel holder consisting of a flat imperforate bottom, of the same size as one side of the caramel, having flanges integral therewith and of a length equal to the side of the bottom, said flanges diminishing in height toward each end, so as to leave the corners open to display the entire thickness of the caramel, substantially as described.

2. A caramel holder consisting of a flat imperforate bottom, of the same size as one side of a caramel, having upturned flanges integral therewith, and of a length equal to the side of the bottom, the upper edges of said flanges running down to the level of the bottom at each end and being slightly flared outwardly at the middle, substantially as described.

3. The combination with a tray, adapted to hold two or more superimposed layers of confections, of a sheet of stiff material to lie between the layers, and supports for said sheet, composed of a strip of stiff material, bent twice at an angle, so as to fit between the confections, substantially as described.

In testimony whereof I affix my signature in presence of two witnesses.

GEORGE MILLER.

Witnesses:
ALAN R. FERGUSSON,
A. J. SCOPMICH.